Patented Dec. 14, 1937

2,102,104

UNITED STATES PATENT OFFICE 2,102,104

MANUFACTURE OF ISATIN DERIVATIVES

Max Wyler, Blackley, Manchester, England, assignor to Imperial Chemical Industries Limited, a corporation of Great Britain No Drawing. Application April 8, 1935, Serial No. 15,312. In Great Britain April 12, 1934

2 Claims. (Cl. 260—47)

This invention relates to the manufacture of novel isatin derivatives. More particularly, this invention deals with N-alkyl-isatin-sulfopyl chlorides, and a process of producing the same.

In my co-pending application, Serial No. 15,313 now Patent No. 2,147,657, issued July 14, 1936, there is described the manufacture of N-alkyl-cyano-formanilides. Another method is described in U. S. Patent No. 1,813,760 to Pfleger, issued July 7, 1931.

According to the present invention I manufacture N-alkyl-isatin-sulfonyl chlorides by treating the said N-alkyl-cyano-formanilides with chlorosulfonic acid. The novel compounds are useful for the manufacture of dyestuffs.

The following example in which parts are by weight illustrates but does not limit the invention.

Example 200 parts of N-ethyl-cyano-formanilide are added to 1600 parts of chlorosulfonic acid and stirred for about 12 hours at 30° C. The reaction is finished when a sample diluted with ice water shows a pure yellow crystalline precipitate. The mixture is run slowly into 6000 parts of ice water, the resulting precipitate is filtered off, washed neutral with water, and dried at about 60° C. The dry product is a green-yellow crystalline powder. Crystallized from benzene it forms yellow leaves, M. P. 137–139° C. Analysis confirms the empirical formula corresponding to N-ethyl-isatin-sulfonyl chloride. The position of the sulfonyl chloride group has not been determined. Boiling with methanol converts it into the methyl sulfonate which forms orange plates, M. P. 134–135° C.

In a similar manner other N-alkyl-cyano-formanilides, for instance N-methyl-cyanoformanilide or N-propyl-cyano-formanilide or those mentioned in British Patent No. 306,450, may be converted into the corresponding N-alkyl-isatin-sulfonyl chlorides. Nuclear substitution derivatives of these, for instance the halogen, alkyl or alkoxy derivatives, may likewise be ring closed to give the corresponding N-alkyl-isatin-sulfonyl-chlorides.

It will be understood that the process above described is susceptible of wide variation and modification, without departing from the spirit of this invention.

I claim:

1. The process of producing N-ethyl-isatin-sulfonyl-chloride which comprises stirring N-ethyl-cyano-formanilide with chlorosulfonic acid at about ordinary room temperature until reaction is substantially complete.

2. N-ethyl-isatin-sulfonyl chloride, being when dry a greenish-yellow crystalline compound having a melting point of 137–139° C. and being identical with the product obtainable by reacting N-ethyl-cyano-formanilide with chlorosulfonic acid at about ordinary room temperature until reaction is substantially complete.

MAX WYLER.

CERTIFICATE OF CORRECTION.

Patent No. 2,102,104.  December 14, 1937.

MAX WYLER.

It is hereby certified that error appears in the printed specification of the above numbered patent requiring correction as follows: First column, line 3, for the syllable "sulfopyl" read sulfonyl; line 6, for the patent number "2,147,657" read 2,047,657; and that the said Letters Patent should be read with these corrections therein that the same may conform to the record of the case in the Patent Office.

Signed and sealed this 8th day of February, A. D. 1938.

Henry Van Arsdale,
Acting Commissioner of Patents.

(Seal)